United States Patent [19]

Kondo et al.

[11] Patent Number: 4,662,471
[45] Date of Patent: May 5, 1987

[54] CHAIN AND SHAFT DRIVE FOR BALLOON TIRED MOTORCYCLE

[75] Inventors: Hiroshi Kondo, Iwata; Tadao Okada, Fukuroi, both of Japan

[73] Assignee: Yamaha Hatsudoki Kabushiki Kaisha, Iwata, Japan

[21] Appl. No.: 829,790

[22] Filed: Feb. 14, 1986

[30] Foreign Application Priority Data

Feb. 15, 1985 [JP] Japan ............................. 60-26529

[51] Int. Cl.⁴ ..................... B62M 7/02; B62M 17/00
[52] U.S. Cl. ............................... 180/226; 180/231
[58] Field of Search ............. 180/226, 231, 227, 217, 180/219

[56] References Cited

U.S. PATENT DOCUMENTS

| | | | |
|---|---|---|---|
| 147,276 | 7/1920 | Dixon | 180/226 |
| 2,316,477 | 4/1943 | Weaver | 180/226 |
| 3,746,113 | 7/1973 | Tidwell | 180/227 |
| 4,039,200 | 8/1977 | McGonegle | 180/227 |
| 4,463,824 | 8/1984 | Boyesen | 180/231 |

FOREIGN PATENT DOCUMENTS

| | | | |
|---|---|---|---|
| 49-27375 | 1/1974 | Japan . | |
| 58-131853 | 1/1983 | Japan . | |
| 566730 | 1/1945 | United Kingdom | 180/226 |
| 735618 | 8/1955 | United Kingdom | 180/226 |

Primary Examiner—John J. Love
Assistant Examiner—Donn McGiehan
Attorney, Agent, or Firm—Ernest A. Beutler

[57] ABSTRACT

An improved final drive arrangement for an off the road motorcycle embodying large low pressure tires wherein the rear wheel is driven from one end of an intermediate shaft that is rotatably supported on the rear wheel supporting trailing arm by means of a drive shaft.

14 Claims, 8 Drawing Figures

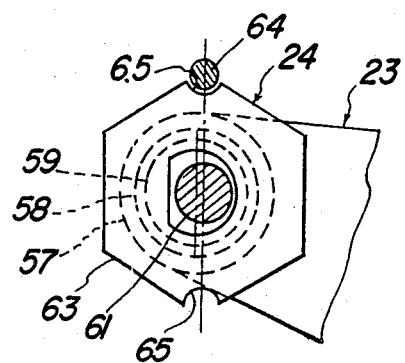
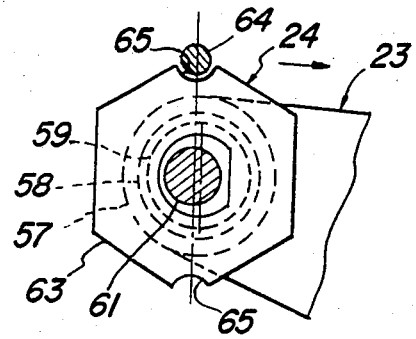

CHAIN AND SHAFT DRIVE FOR BALLOON TIRED MOTORCYCLE

BACKGROUND OF THE INVENTION

This invention relates to a chain and shaft drive for a balloon tired motorcycle and more particularly to an improved drive for such a motorcycle embodying a drive shaft in the final drive portion.

It has recently been proposed to equip motorcycles with large, low pressure balloon tires to adapt them for off the road use. The rear wheel and its mounted tire generally have a width that is at least equal and oftentimes greater than the width of the frame. This presents certain problems in connection with the drive of the rear wheel. For example, if the rear wheel is driven directly from the output shaft of the engine, then the final drive extends at a substantial width relative to the longitudinal center line of the motorcycle from the engine rearward. This provides a substantial increase in width in the area between the rider's legs and gives rise to an unnatural riding position.

In order to overcome these difficulties, it has been proposed to provide a two chain drive for the rear wheel such as shown in copending application Ser. No. 632,717, filed July 20, 1984 in the name of Nobuaki Shiraishi, entitled "Offroad Running Motorcycle" and assigned to the same assignee as this application. Although this type of arrangement has the advantages of maintaining a narrow width in the area between the rider's legs, it presents certain disadvantages. For example, when a two chain drive is employed, it is difficult to provide an adequate and yet simple mechanism for adjusting the tension on the individual chains. In addition, the final drive chain is of such a size that it can easily be contaminated during the off the road use, particularly when leaning the vehicle for turning in sandy territory or the like.

It is, therefore, a principal object of this invention to provide an improved drive mechanism for an off the road motorcycle.

It is a further object of this invention to provide an improved and compact drive arrangement for an off the road vehicle.

It is a still further object of this invention to provide an improved drive arrangement for an off the road vehicle wherein a shaft is used as the final drive.

SUMMARY OF THE INVENTION

A first feature of this invention is adapted to be embodied in an off the road motorcycle having frame means, at least one balloon tired rear wheel having a width substantially the same as the width of the frame means and trailing arm means that support the rear wheel for movement relative to the frame means. An engine is supported by the frame means and drives an output element. An intermediate shaft is journaled by the trailing arm and is driven at one end from the output element. In accordance with the invention, the opposite end of the intermediate shaft drives the rear wheel through a drive shaft.

BRIEF DESCRIPTION OF THE DRAWINGS

FIG. 7 is a cross-sectional view taken in the direction of the line 7—7 in FIG. 6.

FIG. 8 is a cross-sectional view, in part similar to FIG. 7, showing the mechanism in another adjusted position.

DETAILED DESCRIPTION OF THE PREFERRED EMBODIMENT

Figure 1:
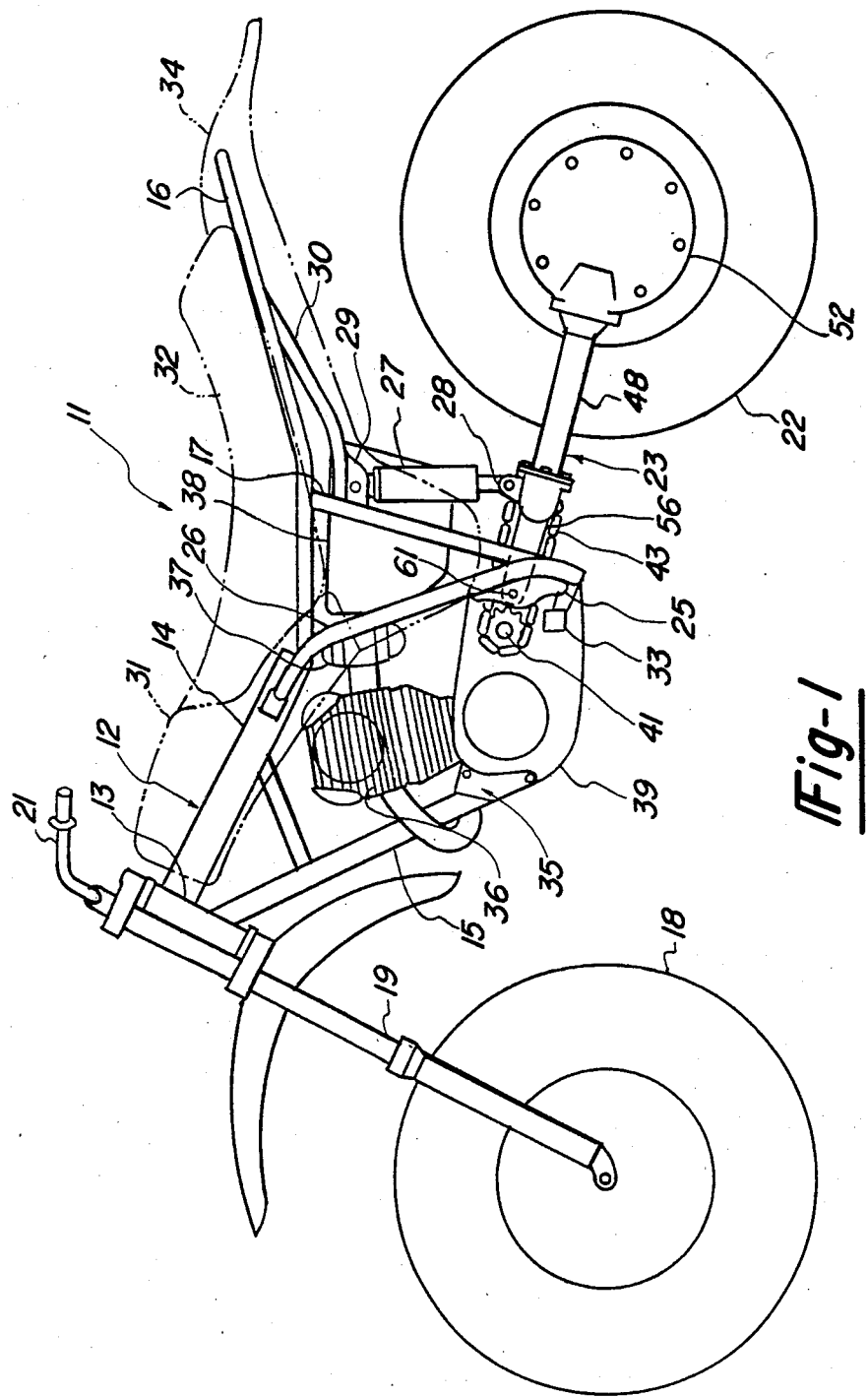
FIG. 1 is a side elevational view of an off the road motorcycle constructed in accordance with an embodiment of the invention, with portions shown in phantom.

A motorcycle constructed in accordance with an embodiment of the invention is identified generally by the reference numeral 11 and includes a frame assembly 12 which may be of any known type and which is illustrated as being of the welded up tubular type of construction. The frame assembly 12 includes a head pipe 13, main pipe 14 and down tubes 15 that are connected to each other in an appropriate manner. A seat rail 16 extends rearwardly from the main tube 14 and is supported at least in part by a seat pillar rail 17.

A front wheel carrying a large, low pressure balloon tire 18 is supported by means of a front fork assembly 19. The front fork assembly 19 is, in turn, journaled for steering movement by the head pipe 13 in a known manner. A handlebar assembly 21 is carried at the upper end of the front fork 19 for steering of the front wheel 18 in a known manner.

Figure 3:
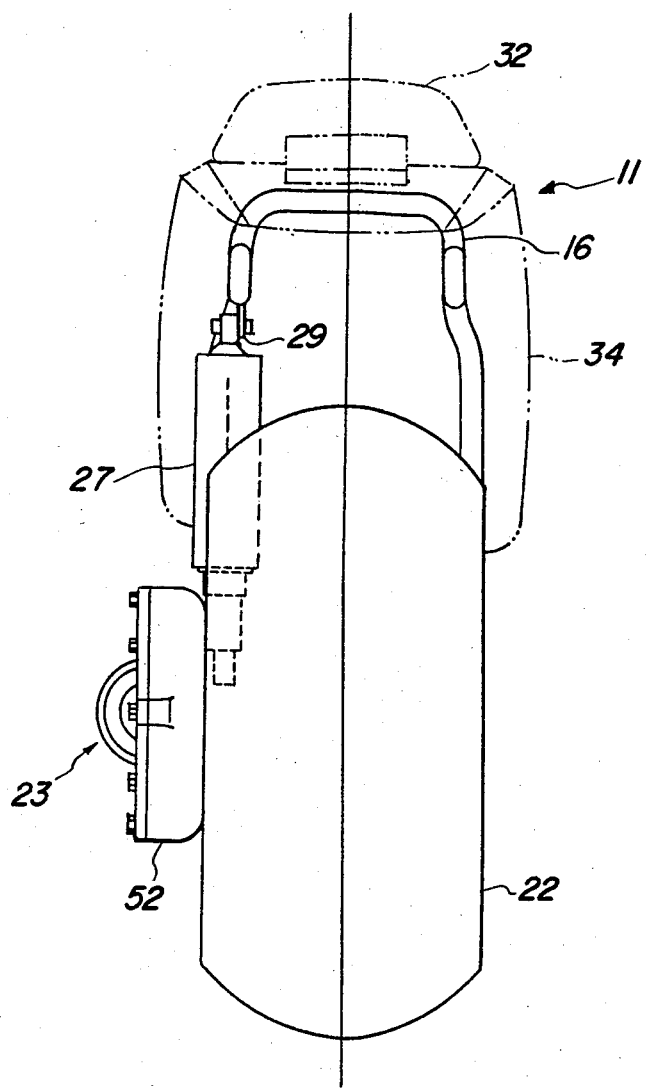
FIG. 3 is an enlarged rear elevational view of the motorcycle.
Figure 4:
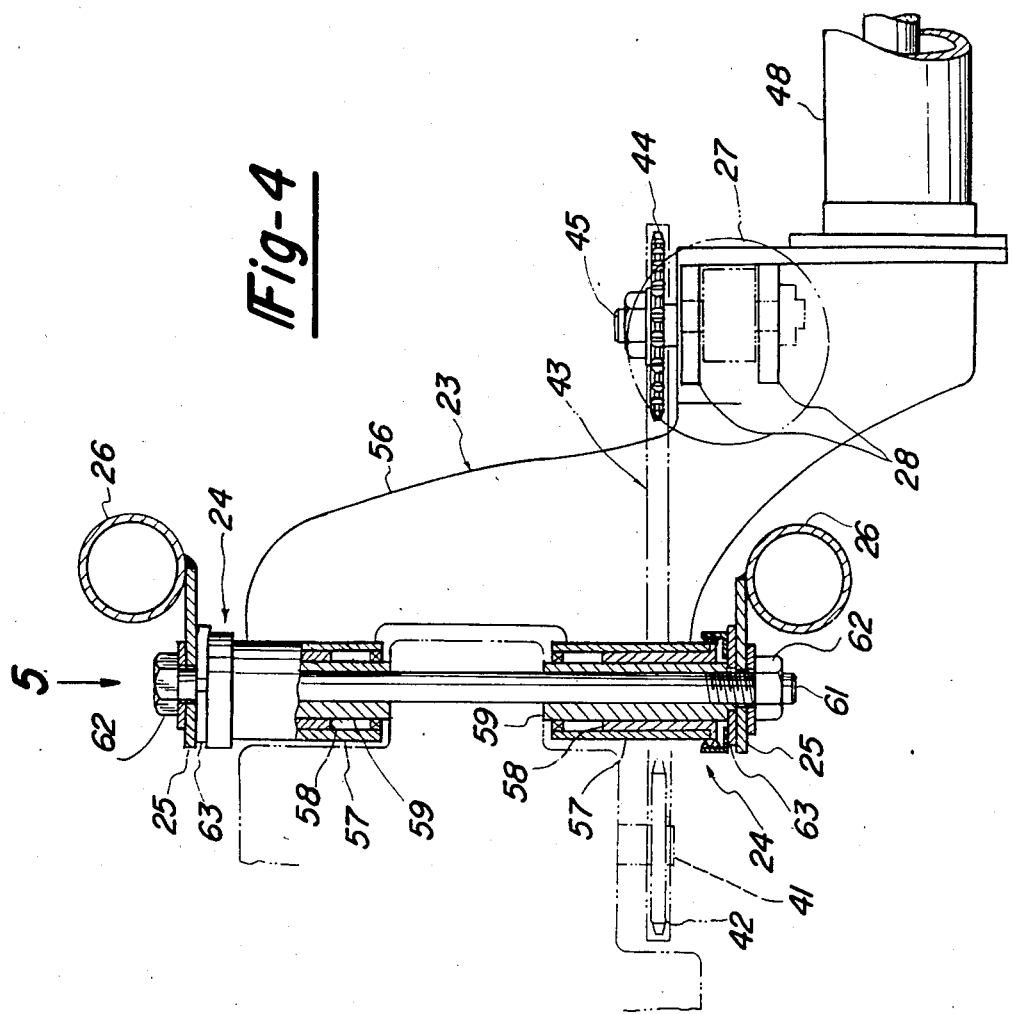
FIG. 4 is a view, in part similar to FIG. 2, but on a further enlarged scale showing the arrangement for adjusting the pivot axis of the trailing arm and the tension of the driving chain, with portions shown in section.
Figure 5:
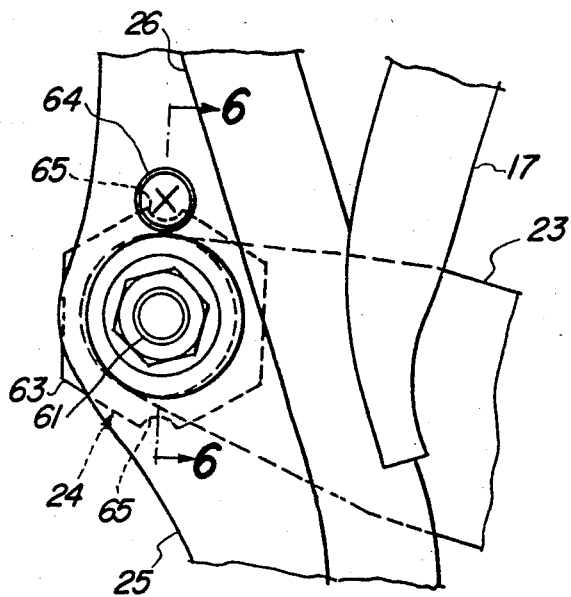
FIG. 5 is an enlarged view in the direction of the arrow 5 in FIG. 4.
Figure 6:
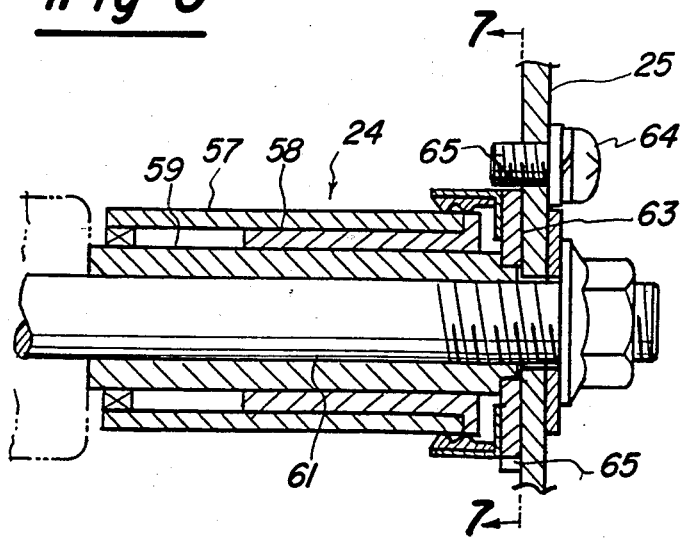
FIG. 6 is a cross-sectional view taken along the line 6—6 of FIG. 5.

A rear wheel carrying a large, low pressure balloon tire is indicated generally by the reference numeral 22 and is supported by means of a trailing arm assembly, indicated generally by the reference numeral 23. It should be noted, particularly from FIG. 3, that the width of the rear wheel 22 is at least equal to and slightly greater than the width of the frame assembly 12.

Figure 2:
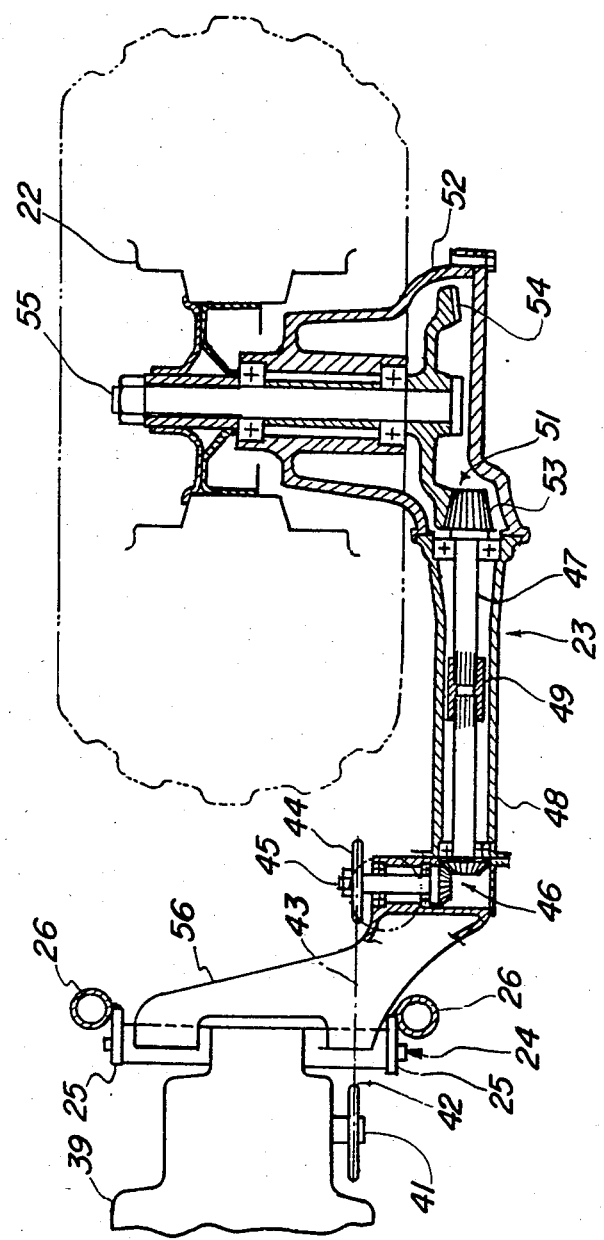
FIG. 2 is an enlarged top plan view, with portions broken away and shown in section, of the final drive arrangement.

The trailing arm assembly 23 is depicted as having a cantilevered shape, as shown in FIG. 2, and is pivotally supported at its forward end by means of an adjustable pivotal support 24 from brackets 25 that are affixed to the rear end of the frame assembly and particularly to a pair of back tubes 26 of the frame assembly.

The suspension movement of the trailing arm assembly 23 and rear wheel 22 relative to the frame assembly 12 is controlled by means of a combined shock absorber and coil spring assembly, indicated generally by the reference numeral 27. The shock absorber and spring assembly 27 is connected at its lower end to a bracket 28 formed on the trailing arm 23. The upper end of the combined spring and shock absorber assembly 27 is connected to the frame 12 and specifically to a bracket 29 that is affixed to a reinforcing brace 29 that extends between the seat pillar rail 17 and the seat rail 16.

A fuel tank 31 is carried by the frame assembly 12 over the main pipe 14 and rearwardly of the head pipe 13. Rearwardly of the fuel tank 31, a seat assembly 32 is supported on the frame 12 and specifically on the seat rails 16, seat pillar rails 17 and reinforcing tubes 29. In order to afford comfort for the rider, a pair of foot pegs 33 are carried at the lower end of the frame 12 to accommodate the rider's feet. A fender 34 is carried by the frame beneath the seat 32 and overlying the rear wheel 22.

A power plant, indicated generally by the reference numeral 35, is carried by the frame 12. The power plant 35 includes an internal combustion engine 36 which may be of any known type and which includes one or more carburetors 37 that deliver a fuel/air charge to the engine 36. An air cleaner 38 is provided for delivering air to the carburetors 37.

The power plant 35 further includes a change speed transmission that is contained within a combined crankcase, transmission assembly 39. The transmission assembly has an output shaft 41 that rotates about an axis that is disposed transversely to the longitudinal axis of the motorcycle 11. A driving sprocket 42 is affixed to the output shaft 41 and is disposed relative close to the longitudinal center line of the motorcycle 11.

A chain 43 encircles the sprocket 42 and a driven sprocket 44 that is affixed to one end of an intermediate shaft 45 that is journaled in an appropriate manner within the interior or the trailing arm assembly 23. A bevel gear assembly 46 transmits drive from the other end of the intermediate shaft 45 to a drive shaft 47 that extends through a tubular portion 48 of the trailing arm assembly 23. Intermediate its ends, the drive shaft 47 is provided with a splined coupling 49 so as to permit adjustment of the effective length of the drive shaft 47 and to adjust the final drive arrangement, now to be described.

A final drive, indicated generally by the reference numeral 51 is contained within a final drive housing 52 for driving the rear wheel 22. The final drive 51 is comprised of a pinion gear 53 that is affixed to the drive shaft 47 and a ring gear 54 that is fixed for rotation with a shaft 55 that is journaled within the final drive housing 52 and which is rotatably coupled, in a suitable manner, to the wheel 22.

The adjustable pivotal support 24 for the trailing arm 23 will now be described by primary reference to FIGS. 4 through 8. This adjustable support 24 is particularly useful for permitting adjustment of the tension in the chain 43.

The trailing arm 23 has a forward portion 56 that extends transversely across the frame assembly 11 and specifically in the area between the brackets 25. It should be noted that the trailing arm assembly 23 is of the cantilevered type and only has a single arm disposed on one side of the rear wheel 22, this being formed by the tube 48. The front end of the portion 56 carries a pair of tubes 57 that extend transversely relative to the longitudinal center line of the motorcycle. The tubes 57 are supported on anti-friction bushings 58 which are, in turn, engaged with the peripheral surface of an eccentric adjusting member 59. The adjusting member 59 has a cylindrical outer surface that is eccentrically disposed to a bore that passes a shaft 61 that is affixed relative to the brackets 25 by means of nuts 62.

Indexing and locking washers 63 are affixed to the outer ends of the eccentric sleeves 59 adjacent to the brackets 25. Locking screws 64 pass through the threaded openings in the brackets 25 and cooperate with recesses 65 formed in the locking washers 63 for fixing the rotational position of the washers 63 and eccentric sleeves 59.

FIG. 7 shows the arrangement adjusted so as to have the chains 43 in its minimum tension position. To tension the chain, the screws 64 are withdrawn sufficiently so as to permit the washers 63 to be rotated. It should be noted that the washers 63 have a hexagonal shape so as to permit the easy rotation of them by an appropriate tool. Because of the eccentricity of the sleeves 59, their rotation will affect longitudinal movement of the pivot axis for the trailing arm 23 so as to cause the trailing arm to move in the direction of the arrow in FIG. 8. This will effect tensioning of the chain 43 and the device can be locked in the tensioned position by retightening the locking screws 64 so that they move into registry with new sets of notches 65.

It should be readily apparent from the foregoing description that a highly effective final drive is provided for an off the road motorcycle wherein there is a simple adjustment for the single driving chain and wherein the final drive is provided by an enclosed drive shaft so that there is not an exposed chain that can be damaged. The chain drive that is employed is positioned at an inward and protected location so that it will not easily become damaged.

Although an embodiment of the invention has been illustrated and described, it should be readily apparent to those skilled in the art that various changes and modifications may be made without departing from the spirit and scope of the invention, as defined by the appended claims.

We claim:

1. In an off the road motorcycle having frame means, at least one balloon tired rear wheel having a width substantially the same as the width of said frame means, trailing arm means for supporting said rear wheel, means pivotally connecting said trailing arm for movement relative to said frame means, an engine supported by said frame means and having a crankcase containing a change speed transmission, an intermediate shaft journaled for rotation on said trailing arm means about an axis extending transversely to the longitudinal axis of the motorcycle and spaced rearwardly of the pivot axis of said trailing arm means, means for driving one end of said intermediate shaft from an output shaft of said change speed transmission, and means for driving said rear wheel from the other end of said intermediate shaft including a drive shaft.

2. In an off the road motorcycle as set forth in claim 1 wherein the drive shaft is enclosed within the trailing arm means.

3. In an of the road motorcycle as set forth in claim 1 wherein a bevel gear drive drives one end of the drive shaft from one end of the intermediate shaft.

4. In an off the road motorcycle as set forth in claim 3 wherein a ring and pinion final drive drives the rear wheel from the other end of the drive shaft.

5. In an off the road motorcycle as set forth in claim 4 wherein the drive shaft is enclosed within the trailing arm means.

6. In an off the road motorcycle as set forth in claim 1 wherein one end of the intermediate shaft is driven from the engine by a flexible transmitter.

7. In an off the road motorcycle as set forth in claim 6 further including means for tensioning the flexible transmitter.

8. In an off the road motorcycle as set forth in claim 7 wherein the means for tensioning the flexible transmitter comprises means for moving the pivot axis of the trailing arm.

9. In an off the road motorcycle as set forth in claim 8 wherein a bevel gear drive drives one end of the drive shaft from the other end of intermediate shaft.

10. In an off the road motorcycle as set forth in claim 9 wherein a ring and pinion final drive drives the rear wheel from the other end of the drive shaft.

11. In an off the road motorcycle as set forth in claim 10 wherein the drive shaft is enclosed within the trailing arm means.

12. In an off the road motorcycle as set forth in claim 2 wherein the trailing arm means is pivotally supported on the frame by transversely spaced apart bearings and comprises single arm extending on only one side of said rear wheel.

13. In an off the road motorcycle as set forth in claim 5 wherein the trailing arm means is pivotally supported on the frame by transversely spaced apart bearings and comprises a single arm extending on only one side of said rear wheel.

14. In an off the road motorcycle as set forth in claim 11 wherein the trailing arm means is pivotally supported on the frame by transversely spaced apart bearings and comprises a single arm extending on only one side of said rear wheel.

* * * * *